UNITED STATES PATENT OFFICE 2,647,151

PRODUCTION OF METHANETHIOL

Richmond T. Bell, Grays Lake, Ill., assignor to The Pure Oil Company, Chicago, Ill., a corporation of Ohio No Drawing. Application October 22, 1949, Serial No. 123,109

3 Claims. (Cl. 260—609)

This invention relates to a method of synthesizing organic sulfur compounds from alcohols by reaction with hydrogen sulfide, and in particular, relates to a method of conducting the reaction in which the formation of mercaptans in the product can be enhanced by suppressing the formation of organic sulfides, normally the principal by-products of such a synthesis.

Because mercaptans have many uses as such and have value in many chemical processes as reactants, it is a fundamental object of this invention to provide a method of carrying out a mercaptan synthesis by means of which the nature of the reaction product can be controlled to a considerable extent so as to enhance the mercaptan content in the product.

A further object of the invention is to provide a method of carrying out the reaction which involves no fundamental modification of processing apparatus, but is based upon manipulation of reactants.

Other objects and advantages of the invention will in part be obvious and in part appear hereinafter.

When mercaptans are synthesized from alcohols and hydrogen sulfide, the reaction product is characterized by containing a mixture of substantial proportions of mercaptans and thioethers, with incidental small amounts of aldehydes and ethers, which result from interaction of the sulfur compounds and the oxygenated compounds as represented by the alcohols. Generally, the mercaptans are the desired products and the significant proportions of thioethers represent loss of yield which puts the process under an economic and competitive disadvantage. Various methods of approach for improving the condition might be adopted, among which would be increasing the specificity of the catalyst for the formation of mercaptans under a given set of conditions, or altering conditions to increase mercaptan formation relative to thioether formation.

I have discovered that rather than emphasize alterations in the nature of the catalyst composition, an alteration in the manipulative technique which involves injecting small amounts of hydrogen into the reaction zone, together with the alcohol and hydrogen sulfide reactants, modifies the catalyst activity in favor of the formation of the mercaptans under certain conditions.

Thus, as a specific example, in the synthesis of methanethiol from methanol and hydrogen sulfide in the presence of a supported thoria catalyst at a temperature in the range from about 300° to 450° C., and at space velocities of 50 to 1500, dimethyl thioether usually constitutes about one-third to one-fourth of the product recovered. When the process is carried out by adding a small amount of hydrogen to the reaction zone together with hydrogen sulfide and methanol, the quantity of dimethyl thioether produced in the reaction is substantially reduced to about one-sixth of the thio-products recovered without decreasing total conversion. This is largely influenced by the amount of hydrogen charged which may vary from about 0.005 to 0.25 mol per cent in the total reaction mixture. Since the process generally employs stoichiometric amounts of methanol and hydrogen sulfide, the amount of hydrogen can also be expressed as a hydrogen-methanol molar ratio of 0.0001–0.005 to 1. At higher hydrogen concentrations, the favorable effect is lost and total conversion is appreciably reduced.

Several tests were carried out in which methanethiol synthesis was conducted by passing a mixture of methanol and hydrogen sulfide over a catalyst consisting of thoria deposited on pumice. Conditions of operation were, in each case, held closely to a temperature of 380° C., and a space velocity of about 660. Determinations of the yield of mercaptan and mercaptan as compared with dimethyl sulfide were made, and it was found that the effect of the hydrogen in enhancing the mercaptan yield commenced at a hydrogen mol fraction of 0.00005 to 0.0001 and that it was still favorable at a hydrogen mol fraction of about 0.0005, but at concentrations from 0.0005 to 0.0025 mol fraction the effect decreased, and at concentrations of about 0.005 mol fraction, the favorable effect was negligible and reduction in catalyst activity began to become apparent. Expressed differently, when the hydrogen is present in the reaction mixture in the amount of 0.01 mol per cent to 0.25 mol per cent, its effect in improving the mercaptan to thioether ratio without materially altering the over-all conversion is best.

In certain ranges of hydrogen concentration within that stated as best, the actual over-all methanol conversion is increased. At higher concentrations of hydrogen, about 0.4 to 0.5 mol per cent, the catalyst activity, as shown by the per cent of methanol converted, is greatly reduced. With larger amounts, such as about 6 mol per cent of hydrogen present, catalyst activity is about one-half of that exhibited with no hydrogen present, and in the presence of about 21 mol per cent of hydrogen, the catalyst activity is only about one-fourth of that without hydrogen. Furthermore, catalyst activity does not immediately revert to normal following exposure to these larger amounts of hydrogen. The following table summarizes some results:

TABLE

*Effect of added hydrogen on reaction of methanol and hydrogen sulfide at 380° C. and 660 space velocity*

| Mol Ratio, $H_2/CH_3OH$, in charge | Percent in Reactant Mixture | $CH_3OH$ Conversion, Total, Percent | Ratio, $\dfrac{\text{Conversion to } CH_3SH}{\text{Conversion to } (CH_3)_2S}$ |
|---|---|---|---|
| No $H_2$ | 0.00 | 20.4 | 3.71 |
| 0.001 | 0.05 | 21.7 | 4.48 |
| 0.004 | 0.20 | 19.6 | 3.73 |
| No $H_2$ | 0.00 | 16.5 | 2.38 |
| 0.010 | 0.49 | 17.9 | 1.74 |
| No $H_2$ | 0.00 | 15.2 | 1.61 |

It will be observed from the data given in the table that although there is a trend toward somewhat decreased catalyst activity when hydrogen concentrations of 0.2 to 0.5 mol per cent are used, the efficacy of the hydrogen in improving the mercaptan to sulfide conversion ratio is apparent, for in the range of hydrogen concentration stated as best, it is clear that the ratio of conversions is increased by about 21 per cent.

The preparation of thoria catalyst found useful in this type of synthesis follows a substantially conventional technique of dissolving a thorium salt in an appropriate quantity of solvent and conducting an evaporation so as to deposit that salt on a suitable carrier, such as pumice. Thereafter, the salt can be decomposed and activated. As a specific example of the preparation, the following is given:

Thorium nitrate in the amount necessary to give a 13:1 mol ratio of thoria to pumice is dissolved in methanol to make about a 20 per cent solution. Pumice purified by acid extraction, water washing, and drying is then impregnated with the thorium nitrate solution, and the solution evaporated down so as to deposit the nitrate in and on the pumice. Following the deposition, the nitrate is decomposed by heating the mixture until the evolution of nitrogen oxides is complete. Following the formation of thorium oxide on the catalyst carrier, the material is put through such appropriate activation steps as will be called for which generally involve heating the material in a stream of one of the reactants to a temperature close to the reaction temperature at which it is to be used.

In the preparation of other mercaptans using other alcohols, catalysts and conditions, the amount of thioether formed may vary depending upon the particular reaction and the conditions chosen. As the case may determine, hydrogen also will function to reduce materially the proportion of sulfide and aldehyde formed and, in general, it will be found that when hydrogen is added in the ratio of about 0.01 to 0.25 mol per cent of the reaction mixture, a material reduction in sulfide formation is accomplished.

A further advantage stemming from the present invention is that, in addition to reducing the extent of formation of sulfides and aldehydes, it does not interfere with the principal reaction desired, namely, the formation of thiols, and it does not affect adversely a wide variety of catalysts. In fact, the addition of hydrogen to the reaction mixture not only retards sulfide formation, but also avoids such action which oxidative impurities in the reaction mixture might produce to cause deposits of free sulfur on the catalyst. Thus, by the inclusion of hydrogen in small amounts in the reaction mixture, the yield of mercaptan is improved, the proportion of sulfide and aldehyde formed is reduced and, further, the deposit of various foreign oxidation products on the solid catalyst is inhibited.

The process chosen to ilustrate the invention involves the preparation of mercaptans by reaction of an alcohol with hydrogen sulfide in the presence of a thoria catalyst supported on pumice. The example was chosen because it appears that thoria is a very good catalyst for the reaction in that it retains its activity for an extended period and produces a useful amount of conversion. The thoria need not be supported on pumice, but any inert or substantially inert carrier will serve about as well, and among the several supports are silica, bauxite and various porous clays. Where a somewhat improved catalyst is desired, an activated support, such as an activated alumina, bauxite, montmorillonite type clays, carbon and silica gel, may be used. In general, a useful catalyst can be prepared by adding an amount of thoria comparable to that stated in the specific example to a support, but substantial variations in the proportions can be made.

In the instant application, wherever the term "space velocity" occurs, it is used with the standard meaning: the ratio of the volume of gas passing through a given volume of catalyst per hour, the volume of gas being reduced to standard conditions of temperature and pressure.

Though this invention has been described in limited fashion with reference to only a certain reaction, it should be clear that the use of hydrogen in this type of reaction, the conversion of an alcohol to a thiol by reaction with hydrogen sulfide, increases the yield and purity of thiols formed, thereby developing economies in the operation of the process and purification of the product.

What is claimed is:

1. The method of making methanethiol from methanol and hydrogen sulfide which comprises, passing a mixture of methanol and hydrogen sulfide as reactants, and introducing hydrogen in the amount above 0.005 but less than about 0.20 mol per cent of said reactants into a reaction zone, contacting said reactants therein in the presence of added hydrogen with a catalyst comprising thoria supported on a carrier at a temperature within the range of about 300° to 450° C. and recovering methanethiol from the reaction zone.

2. The method in accordance with claim 1 in which the space velocity is about 660.

3. The method in accordance with claim 2 in which the catalyst is thoria supported on pumice.

RICHMOND T. BELL.

References Cited in the file of this patent

UNITED STATES PATENTS

| Number | Name | Date |
|---|---|---|
| 2,070,761 | Szeszich | Feb. 16, 1937 |
| 2,116,182 | Bauer | May 3, 1938 |
| 2,402,613 | Farlow et al. | June 25, 1946 |
| 2,514,299 | Sumerford | July 4, 1950 |
| 2,514,300 | Laughlin | July 4, 1950 |

OTHER REFERENCES

Mellor, "Comprehensive Treatise on Inorganic and Theoretical Chemistry," volume 10, pages 116–117 (Longmans, Green and Co., New York, 1930).